United States Patent [19]

Tanaka et al.

[11] Patent Number: 4,571,647
[45] Date of Patent: Feb. 18, 1986

[54] TAPE RECORDER

[75] Inventors: Shinsaku Tanaka; Tadao Arata, both of Tokyo, Japan

[73] Assignee: Tanashin Denki Co., Ltd., Tokyo, Japan

[21] Appl. No.: 461,192

[22] Filed: Jan. 26, 1983

[30] Foreign Application Priority Data

Jan. 27, 1982 [JP] Japan .............................. 57-9560[U]

[51] Int. Cl.⁴ .......................... G11B 21/22; G11B 5/54
[52] U.S. Cl. .................................... 360/105; 360/96.1
[58] Field of Search .......................... 360/105, 93–96.6

[56] References Cited

U.S. PATENT DOCUMENTS 3,899,795  8/1975  Watanabe ...................... 360/105 X
3,916,443 10/1975  Bumb ............................. 360/105 X
4,101,946  7/1978  Takamatsu ......................... 360/105

Primary Examiner—A. J. Heinz
Attorney, Agent, or Firm—Frishauf, Holtz, Goodman & Woodward

[57] ABSTRACT

A tape recorder has a base plate, at least one reel shaft, a head holder and a magnetic head. It further comprises a guide piece, a guide groove and at least one projection. The guide piece is made of a synthetic resin and mounted on the base plate (or the head holder). The guide groove is cut in the head holder (or the base plate) for receiving the guide piece to thereby restrict the direction in which the head holder moves. The projection is provided on the head holder (or the base plate). The end of the guide piece rides on the projection when the head holder is brought to a position where the magnetic head contacts a magnetic tape, whereby the projection urges the head holder against the base plate.

12 Claims, 8 Drawing Figures 4,571,647

TAPE RECORDER

BACKGROUND OF THE INVENTION

This invention relates to a tape recorder in which the magnetic head can be reliably positioned with respect to the direction of the tape width.

In a tape recorder, usually a head holder supporting a magnetic head is mounted on a base plate of the recorder carrying a reel shaft mounted thereon and can slide over the base plate to selectively bring the magnetic head into contact with and away from the magnetic tape, and the recording and reproduction are done with the magnetic head in contact with the magnetic tape.

Accordingly, the magnetic head must be reliably positioned with respect to the direction of the tape width at least when the head is in contact with the tape. To this end, it is necessary to prevent the head holder from floating from the base plate of the recorder.

Hitherto, it has been proposed to prevent the floating of the head holder by using a leaf spring or the like which serves to urge the head holder against the base plate at all times.

Where the head holder is held urged against the base plate at all times, however, a strong frictional resistance against movement is produced between the base plate and head holder when the head holder is moved. Therefore, the head holder cannot be moved lightly, which is undesired from the standpoint of operability. Besides, an extra spring member such as a leaf spring is necessary. Further, this additional member requires an additional mounting step in the manufacture of the recorder.

SUMMARY OF THE INVENTION

An object of the invention is to provide a tape recorder, with which the head holder can be moved lightly, and which does not require a particular spring member such as a leaf spring to the end noted above and permits reliable positioning of the magnetic head with respect to the tape width direction.

According to the invention, the frictional surface of either the base plate of the recorder or the head holder is provided with a guide piece made of a synthetic resin, while the other member of the base plate and head holder than the one with the guide piece is provide with a guide groove or slot receiving the guide piece and restricting the direction of movement of the head holder and also with a projection, so that the end of the guide piece comes to ride on the projection when the head holder is brought to a postion at which the magnetic head is in contact with the magnetic tape. The head holder is thus urged tightly against the base plate of the recorder when the head holder is brought to the position noted above.

When the magnetic head is brought to a position in contact with the magnetic tape, the end of the guide piece rides on the projection to urge the head holder tightly against the base plate of the recorder to prevent the floating of the head holder. Thus, it is possible to obtain reliable positioning of the magnetic head in the direction of the tape width.

In addition, when the magnetic head is separated from the magnetic tape, the end of the guide piece is also separated from the projection so that the contact pressure between the base plate and head holder can be reduced. Thus, the head holder can be moved lightly, and the operability can be improved.

Further, since the guide piece which has the main role of restricting the direction of movement of the head holder is utilized to urge the head holder against the base plate in co-operation with the projection, no particular part such as a leaf spring to this end is necessary. Thus, the construction can be simplified, and also the step of mounting such a part in the manufacture of the record can be dispensed with.

DETAILED DESCRIPTION OF THE PREFERRED EMBODIMENT

Figure 1:
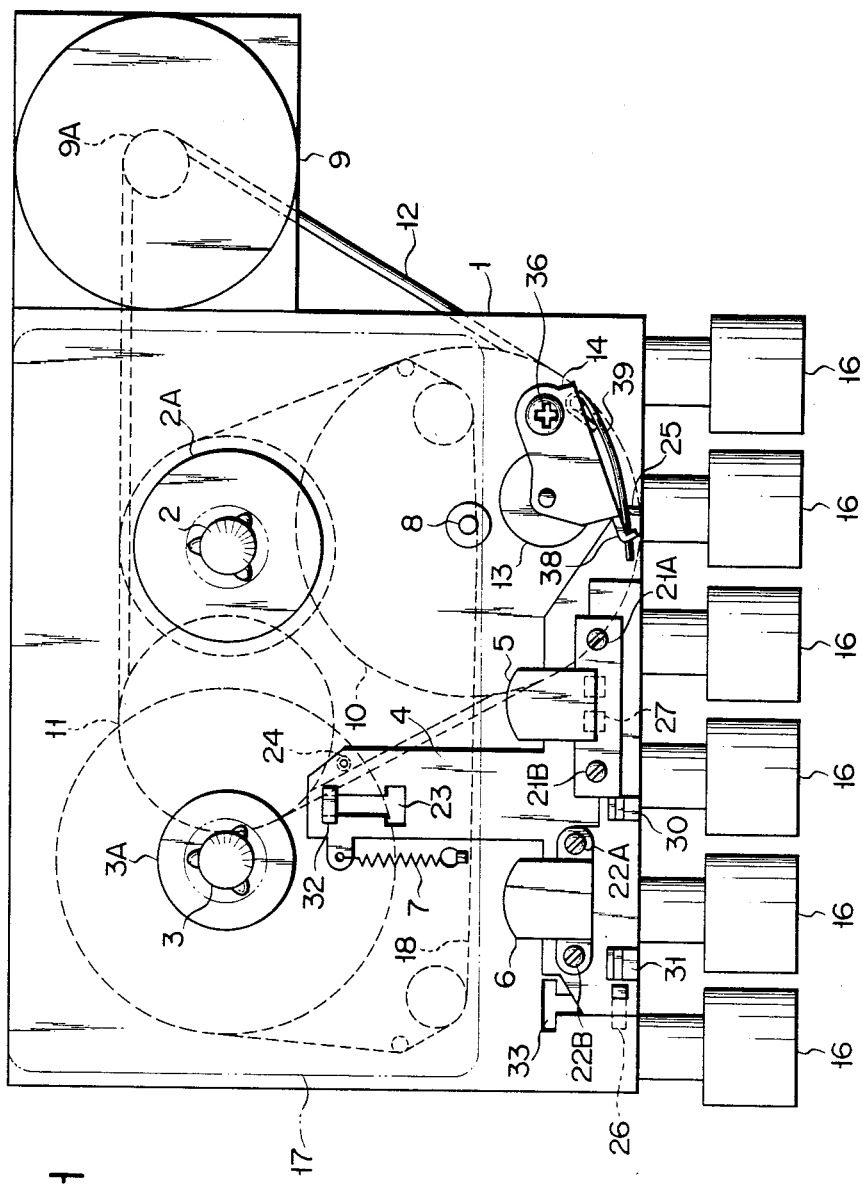
FIG. 1 is a plan view showing the mechanical parts of a cassette tape recorder.

FIG. 1 shows the mechanical parts of a cassette tape recorder embodying the invention. Reference numeral 1 designates a base plate of the recorder. A pair of reel shafts 2 and 3 penetrate and upwardly project from the base plate 1. The reel shafts 2 and 3 carry respective rotation transmitting members 2A and 3A such as pulleys or gears mounted on their stem. A head holder 4 is provided such that it is slidable over the top of the base plate 1. A magnetic head 5 for recording and reproduction and a magnetic head 6 for erasing are mounted on top of the head holder 4. The head holder 4 is spring biased by a tension coil spring 7 so as to urge both the reel shafts 2 and 3 away from the magnetic heads 5 and 6.

A capstan shaft 8 and a motor 9 are also mounted on the base plate 1. The capstan shaft 8 upwardly projects from the base plate 1. The capstan shaft 8 carries a flywheel 10 secured to its stem extending below the base plate 1. Further, an intermediate pulley 11 and a plurality of idlers (not shown) are mounted on the underside of the base plate 1. An endless belt 12 is passed around a motor pulley 9A directly coupled to the motor 9, the flywheel 10 and the intermediate pulley 11. The capstan shaft 8 and intermediate pulley 11 are thus commonly driven by the motor 9.

Figure 2:
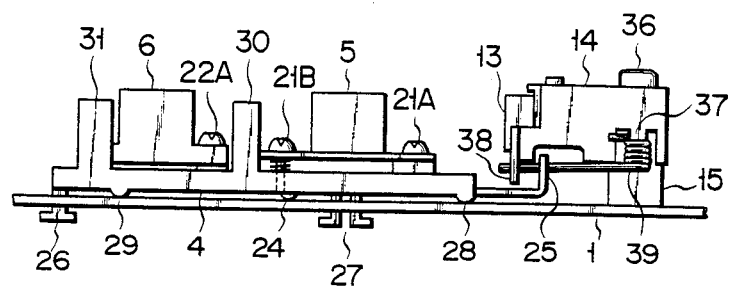
FIG. 2 is a front view showing a head holder and a pinch roller holder in FIG. 1 in detail.
Figure 3:
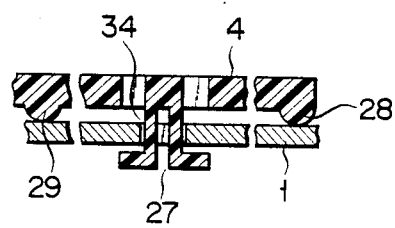
FIG. 3 is a sectional view showing the relation between a base plate and a head holder showin in FIG. 2.
Figure 4:
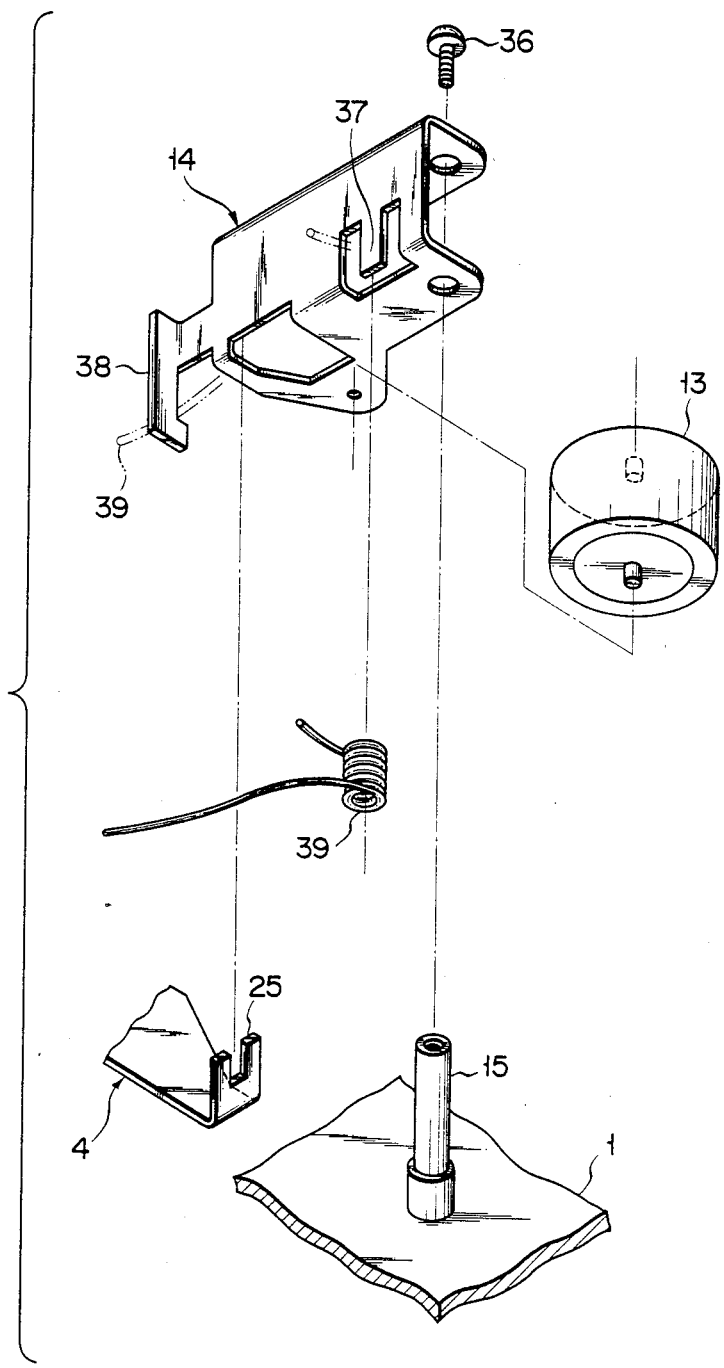
FIG. 4 is an exploded perspective view showing the relation of the pinch roller holder to the base plate.

A pinch roller holder 14 supporting a pinch roller 13 is rotatably mounted by a shaft 15 on top of the base plate 1 (see FIGS. 2 and 4). A plurality of push buttons 16 for causing various operations of the recorder are mounted along one edge of the base plate 1.

When a tape cassette 17 is set on both the reel shafts 2 and 3, a magnetic tape 18 in the tape cassette 17 is arranged between the capstan shaft 8 and pinch roller 13 and ahead of the magnetic heads 5 and 6.

Figure 5:
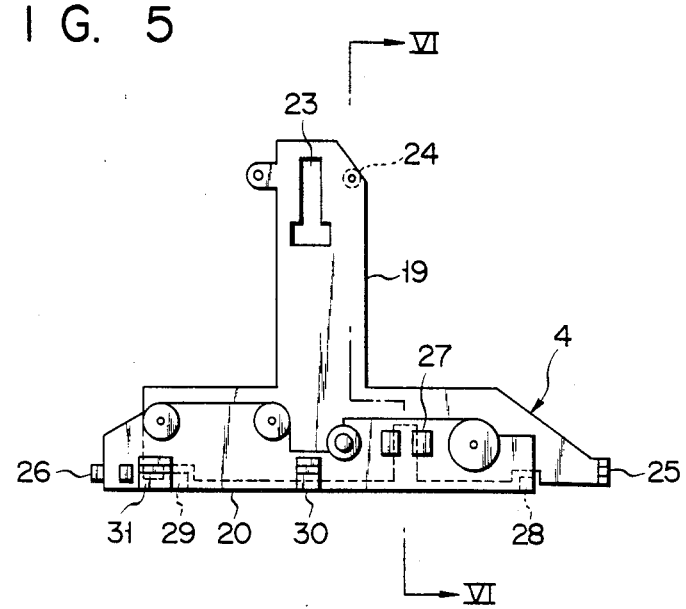
FIG. 5 is a plan view showing the head holder.
Figure 6:
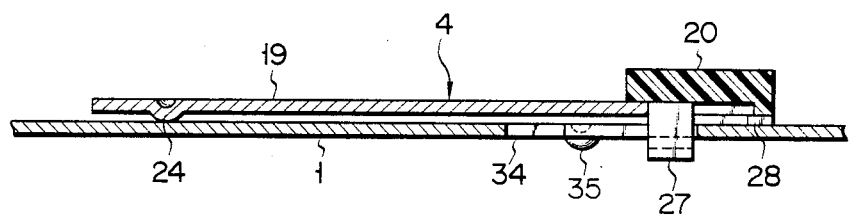
FIG. 6 is a sectional view taken along line $\overline{VI}$—$\overline{VI}$ in FIG. 5.

As shown in FIG. 5, the head holder 4 includes a mounting member 19 comprising a metal plate and a head supporting member 20 made of a synthetic resin secured by screws 21A, 21B, 22A and 22B (see FIG. 2) to the top of a rear edge portion of the mounting member 19. As seen in FIGS. 1 and 2, the screws 21A and 21B also serve as screws for mounting the magnetic head 5 for recording and reproduction, and the other screws 22A and 22B also serve as screws for mounting the magnetic head 6 for erasing. The mounting member 19 has an elongate guide hole 23 formed in its front end portion. This front end portion also has a downwardly projecting protuberance which is formed by embossing. The mounting member 19 further has a rightwardly projecting engagement portion 25. This engagement portion 25 is formed by bending a right end portion of the mounting member 19 at right angles and by branching the upright portion into two portions. The head supporting member 20 has downwardly projecting guide pieces 26 and 27. The guide piece 26 is provided at the left hand end of the head supporting member 20, while the guide piece 27 corresponds in position to a portion of the member 19 where the magnetic head 5 is mounted. The head supporting member 20 further has downwardly projecting protuberances 28 and 29. The protuberance 28 is provided at the right end, while the protuberance 29 is provided on the left side of the center of the member 20. The guide piece 27 is bifurcated and has left and right portions defining a small gap. The left portion has a leftwardly extending end portion, while the right portion has rightwardly extending end portion.

Figure 7:
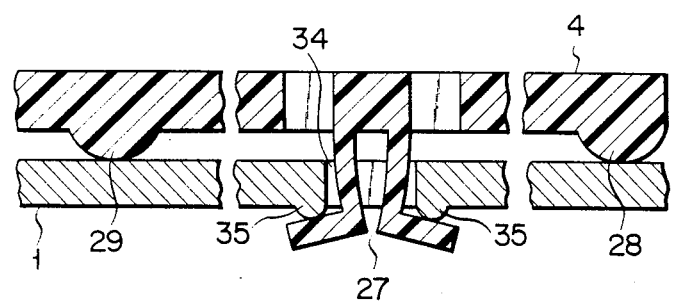
FIG. 7 is a fragmentary sectional view, to an enlarged scale, showing a bifurcated guide piece in an operative state.

The base plate 1 is provided with a guide piece 32, which penetrates the guide hole 23 noted above, and also with guide slots 33 and 34, which are penetrated by the respective guide pieces 26 and 27 of the head holder 4. The guide hole 23, guide pieces 32 and 26, guide slot 33, guide piece 27 and guide slot 34 serve together to restrict the head holder 4 such that the head holder 4 can be moved only in the forward and rearward directions. As shown in FIGS. 2, 3, 6 and 7, the head holder 4 is supported on the base plate 1 at three points, i.e., with the three protuberances 24, 28 and 29 in contact with the top of the base plate 1. The base plate 1 further has downwardly projecting protuberances 35 formed on the opposite sides of the guide slot 34. When the head holder 4 is moved forwardly so that the magnetic heads 5 and 6 are brought into contact with the magnetic tape 18 in the tape cassette 17, the bent ends of the leg portions of the bifurcated guide piece 27 come to ride on the respective protuberances 35 as shown in FIG. 7. Thus, the three protuberances 24, 28 and 29 noted above are urged against the base plate 1 of the recorder by the eleastic forces of the guide piece 27.

The pinch roller holder 14, as shown in FIG. 4, has a channel-like shape, and is pivotally mounted at one end on the shaft 15. A retainer screw 36 is screwed into the shaft 15 from the top thereof to prevent detachment of the pinch roller holder 14 from the shaft 15. The pinch roller 13 is rotatably supported between opposed portions of the pinch roller holder 14. The pinch roller holder 14 has a spring support piece 37 formed in its central portion and also has a spring retainer piece 38 formed in its end portion opposite the shaft 15. A torsion coil spring 39 is mounted on the spring support piece 37. The spring 39 is fitted on the spring support piece 37, and its opposite ends are respectively engaged with the neighborhood of the spring support piece 37 and with the spring retainer piece 38 so that it is held slightly energized in the direction of its winding. One end of the torsion coil spring 39 is further adapted to be engaged in a bifurcated engagement portion 25 of the head holder 4.

The operation of the tape recorder will now be described.

When the push button 16 for recording or reproducing operation is depressed, the motor 9 is rotated to drive the capstan shaft 8 and intermediate pulley 11. Also, the head holder 4 is forwardly moved against the spring force of the spring 7 to bring the magnetic heads 5 and 6 into contact with the magnetic tape 18 in the tape cassette 17. With the forward movement of the head holder 4, the aforementioned end of the torsion coil spring 39 is engaged in the engagement portion 25 to cause rotation of the pinch roller holder 14, so that the pinch roller 13 is brought to be urged against the capstan shaft 8 via the magnetic tape 18. At this time, the pinch roller holder 14 is smoothly rotted without interference from the torsion coil spring 39. After the pinchroller 13 has been brought to be urged against the capstan shaft 8, the head holder 4 is further forwardly moved slightly. With this movement, restoring energy is stored in the torsion spring 39 to increase the force with which the pinch roller 13 is urged against the capstan shaft 8. Further, with the forward movement of the head holder 4, the ends of the leg portions of the bifurcated guide piece 27 come to ride on the protuberances 35. Thus, the floating of the head holder 4 is prevented, and the magnetic heads 5 and 6 are reliably positioned with respect to the direction of the tape width. When the push button 16 is further depressed, idlers (not shown) mounted on the underside of the base plate 1 are rendered operative to transmit the torque of the intermediate pulley 11 to the take-up reel side rotation transmitting member 2A. Consequently, the capstan shaft 8 and take-up reel shaft 2 are rotated to drive the magnetic tape 18 at a constant speed, whereby a predetermined recording or reproducing operation is carried out.

When a stop push button 16 is depressed in the state of the recording or reproducing operation, the push button for the recording or reproducing operation is released from its locked state and restored to the initial state. This has an effect of causing the head holder 4 to be restored by the spring 7, thus separating the magnetic heads 5 and 6 from the magnet tape 18 and also separating the pinch roller holder 14 from the capstan shaft 8. At the same time, the idler are caused to cut the torque transmission route from the intermediate pulley 11 to the rotation transmitting member 2A. Furthermore, the motor 9 is de-energized to stop the intermediate pulley 11 and capstan shaft 8.

When a push button 16 for fast-feed or re-winding is depressed, the head holder 4 is not moved, and hence the pinch roller holder 14 is not locked. However, the motor 9 is rotated, while the idlers (not shown) are rendered operative to transmit the torque of the intermediate pulley 11 to the rotation transmitting member 2A on the take-up side or to the rotation transmitting member 3A on the supply side. The magnetic tape 18 is thus taken up at a high speed on the take-up reel or supply reel in the tape cassette 17.

As has been shown, when the magnetic heads 5 and 6 in the above embodiment of the tape recorder are brought into contact with the magnetic tape 18, the bent ends of the leg portions of the bifurcated guide piece 27 come to ride on the protuberances 35 to urge the slidable protuberances 24, 28 and 29 provided on the underside of the head holder 4 against the base plate 1 of the recorder. Thus, the floating of the head holder 4 is prevented, so that the magnetic heads 5 and 6 can be reliably positioned with respect to the direction of the tape width. Particularly, the fact that the guide piece 27 is provided right under the magnetic head 5 for recording and reproduction is greatly effective for the positioning of this head 5 and also for obtaining satisfactory recording or reproducing operation.

Further, when the magnetic heads 5 and 6 are separated from the magnetic tape 18, the bent ends of the leg portions of the bifurcated guide piece 27 are disengaged from the protuberances 35. Thus, the contact pressure between the base plate 1 and the head holder 4 can be reduced so that the head holder 4 can be lightly moved. That is, the force for pushing the push buttons 16 can be reduced to improve the operability.

Further, the guide piece 27 which has the main purpose of restricting the direction of movement of the head holder 4 is utilized such that it cooperates with the protuberances 35 to prevent the floating of the head holder 4. In other words, there is no need of providing any particular part such as a leaf spring which has the sole function of preventing the floating of the head holder 4. Thus, it is possible to simplify the construction and also there is no need of providing any step of mounting such a particular part in the manufacture of the tape recorder.

Further, since a part of the head holder 4 is the head supporting member 20 made of a synthetic resin and the two magnetic heads 5 and 6 and the guide piece 27 are integrally provided on this member, the positioning of both the heads 5 and 6 and the guide piece 27 relative to one another can be done with high precision.

Figure 8:
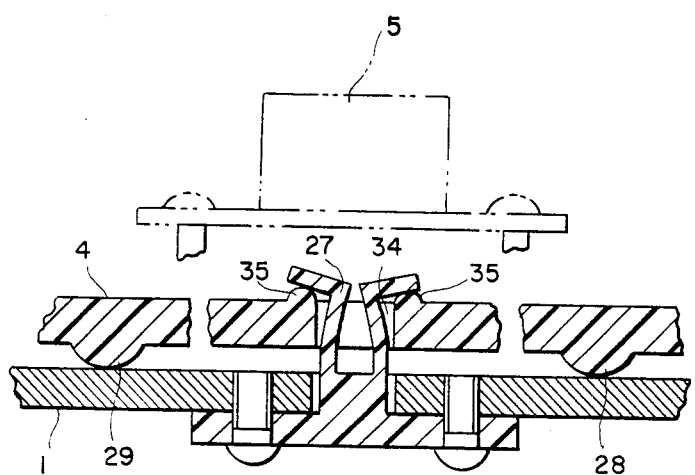
FIG. 8 shows a modified embodiment of the invention.

It is to be understood that the embodiment described above is by no means limitative. For example, the head holder 4 may be formed as a one-piece member of a synthetic resin. Further, as shown in FIG. 8, it is possible to provide a base plate 1 with a guide piece of a synthetic resin, while providing a head holder 4 with a guide groove or slot for receiving the guide piece and also with a protuberance such that the end of the guide piece can ride on the protuberance to prevent the floating of the head holder 4.

Further, the bifurcated guide piece 27 may be replaced by one having any other suitable shape.

Further, the invention is applicable not only to a cassette tape recorder but also to various other types of tape recorders such as open reel types as well.

What we claim is:

1. A tape recorder comprising:
   a base plate;
   at least one reel shaft mounted on said base plate for rotating a reel, said reel having magnetic tape wound thereon;
   a head holder slidably mounted on said base plate;
   at least one magnetic head mounted on said head holder;
   said head holder being slidable between first and second positions over one surface of said base plate, said first position being a position where said at least one magnetic head is spaced from said magnetic tape, and said second position being a position where said at least one magnetic head is in contact with said magnetic tape;
   a guide piece on said base plate;
   an elongated guide slot in said head holder for receiving said guide piece to restrict movement of said head holder in a direction along the length of said guide slot; and
   at least one projection provided on a surface of said head holder adjacent an end of said guide slot, said guide piece having an end portion which is arranged to engage said projection for only a limited excursion when said hed holder is in the vicinity of said second position while being moved from said first position to said second position where said at least one magnetic head contacts said magnetic tape, said projection contacting said end portion of said guide piece to forcibly urge said head holder against said base plate during said limited excursion to fixedly position said at least one magnetic head relative to the width of the magnetic tape, said at least one projection being out of contact with said end portion of said guide piece when said head holder is at its first position and when it is not in the close vicintiy of said second posotion.

2. The tape recorder of claim 1, wherein said guide piece is arranged to ride on said projection when said projection is at a position beneath said magnetic head.

3. The tape recorder of claim 1, wherein said head holder is manually operable to slide same between its said first and second positions.

4. A tape recorder comprising:
   a base plate;
   at least one reel shaft mounted on said base plate for rotating a reel, said reel having magnetic tape wound thereon;
   a head holder slidably mounted on said base plate;
   at least one magnetic head mounted on said head holder;
   said head holder being slidable between first and second positions relative to said base plate, said first position being a position where said at least one magnetic head is spaced from said magnetic tape, and said second position being a position where said at least one magnetic head is in contact with said magnetic tape;
   a guide piece on said head holder said guide piece being made of a synthetic resin;
   a guide groove in said base plate for receiving said guide piece to restrict the direction of movement of said head holder; and
   at least one projection provided on a surface of said base plate adjacent an end of said guide slot, said guide piece having an end portion which is arranged to engage said projection for only a limited excursion when said head holder is in the close vicinity of said second position while being moved from said first position to said second position where said at least one magnetic head contacts said magnetic tape, said projection contacting said end portion of said guide piece to forcibly urge said head holder against said base plate during said limited excursion to fixedly position said at least one magnetic head relative to the width of the magnetic tape, said at least one projection being out of contact with said end portion of said guide piece when said head holder is at its first position and when it is not in the close vicinity of said second position.

5. The tape recorder of claim 4, wherein said head holder includes a magnetic head mounting section, at least said magnetic head mounting section being made of a synethetic resin, said guide piece and said magnetic head mounting section being integrally formed of said synthetic resin.

6. The tape recorder of claim 5, wherein said guide piece is arranged to ride on said projection only when said guide piece is at a position beneath said magnetic head.

7. The tape recorder of claim 6, wherein said head holder is manually operable to slide same between its said first and second positions.

8. The tape recorder of claim 4, wherein said guide piece is arranged to ride on said projection only when said guide piece is at a position beneath said magnetic head.

9. The tape recorder of claim 4, wherein said head holder is manually operable to slide same between its said first and second positions.

10. The tape recorder of claim 4, wherein said guide piece is an elastic guide piece.

11. The tape recorder of claim 10, wherein said guide piece comprises a pair of generally L-shaped members directed away from each other and having a space therebetween, said L-shaped members having end pieces extending substantially parallel to said base plate, said end pieces of said guide members engaging said at least one projection of said base plate when said head holder is in said close vicinity of said second position.

12. The tape recorder of claim 4, comprising a plurality of said guide pieces and a plurality of said projections, said guide pieces engaging and riding on a respective one of said projections.

* * * * *

UNITED STATES PATENT AND TRADEMARK OFFICE
CERTIFICATE OF CORRECTION

PATENT NO. : 4,571,647

DATED : February 18, 1986

INVENTOR(S) : Shinsaku TANAKA et al

It is certified that error appears in the above-identified patent and that said Letters Patent is hereby corrected as shown below:

Column 1, line 48, change "provide" to --provided--.

Column 2, line 22, change "$\overline{VI}$-$\overline{VI}$" to --$\underline{\overline{VI}}$-$\underline{\overline{VI}}$--.

Column 6, line 36, change "relative to" to --over one surface of--.

Column 6, lines 42-43, delete "said guide piece being made of a synthetic resin".

Column 6, line 44, change "a guide groove" to --an elongated guide slot--.

Column 6, line 45, delete "the direction of".

UNITED STATES PATENT AND TRADEMARK OFFICE
CERTIFICATE OF CORRECTION

PATENT NO. : 4,571,647  PAGE 2 OF 2
DATED : February 18, 1986
INVENTOR(S) : Shinsaku TANAKA et al It is certified that error appears in the above-identified patent and that said Letters Patent is hereby corrected as shown below:

Column 6, line 46, after "head holder" insert --in a direction along the length of said guide slot--.

Signed and Sealed this

Eleventh Day of November, 1986

*Attest:*

DONALD J. QUIGG

*Attesting Officer*  *Commissioner of Patents and Trademarks*